United States Patent [19]
Keith

[11] Patent Number: 5,682,928
[45] Date of Patent: Nov. 4, 1997

[54] METHOD AND APPARATUS FOR MAKING BATTERY PLATES

[75] Inventor: Larry T. Keith, Salem, Oreg.

[73] Assignee: Entek Manufacturing Inc., Lebanon, Oreg.

[21] Appl. No.: 667,069

[22] Filed: Jun. 20, 1996

[51] Int. Cl.$^6$ ............................................. H01M 4/00
[52] U.S. Cl. .................................. 141/33; 141/1.1; 29/2; 29/623.3; 29/623.5
[58] Field of Search ................... 141/1.1, 32, 33; 29/2, 623.3, 623.5

[56] References Cited

U.S. PATENT DOCUMENTS

| | | | |
|---|---|---|---|
| 3,841,362 | 10/1974 | Haller et al. | 141/32 |
| 4,443,918 | 4/1984 | Morinari et al. | 29/2 |
| 4,547,939 | 10/1985 | McDowall et al. | 29/2 |
| 4,606,383 | 8/1986 | Yanik | 141/32 |
| 4,878,521 | 11/1989 | Fredrickson | 141/1.1 |
| 4,878,522 | 11/1989 | Ostrander | 141/1.1 |
| 4,932,443 | 6/1990 | Karolek et al. | 141/1.1 |
| 5,276,960 | 1/1994 | Wheadon et al. | 29/623.5 |
| 5,467,805 | 11/1995 | Farina | 141/32 |

*Primary Examiner*—J. Casimer Jacyna
*Attorney, Agent, or Firm*—Robert E. Howard

[57] ABSTRACT

A method of making metal hydroxide plate blanks for use in an electrochemical cell which includes compressing a porous metal web in at least one compression zone to a substantially non-porous state, attaching at least one a non-porous strip of the same metal to the porous metal web in the area of the compression zone, impregnating the porous metal web with a coating of electrochemically active material to form an impregnated web, removing excess coating from the impregnated web, drying the impregnated web, and dividing the dried web into plate blanks in the area of the metal strip. The metal is selected from the group consisting of nickel, silver and copper, with the preferred metal being nickel. An apparatus for practicing the invention is also disclosed which includes a device for compressing a porous metal web in a compression zone, a device for attaching at least one non-porous strip of the same metal to the porous metal web in the area of the compression zone, a coating device for impregnating the porous metal web with a coating of electrochemically active material, a device for removing excess coating from the impregnated web, a device for drying the impregnated web, and a device for separating the dried web into plate blanks in the area of the metal strip.

9 Claims, 6 Drawing Sheets

METHOD AND APPARATUS FOR MAKING BATTERY PLATES

BACKGROUND OF THE INVENTION

This invention relates to a method and apparatus for making electrodes (plates) for alkaline secondary batteries. More particularly, the invention relates to a method and apparatus for making metal hydroxide and/or metal oxide cathodes for alkaline secondary batteries.

In alkaline batteries wherein the positive plate (cathode) is a metal hydroxide and/or a metal oxide, the plate construction is typically a porous metal substrate impregnated with active material comprising the metal hydroxide and/or oxide powder, binder and other ingredients providing useful properties. The metal hydroxides and or oxides may be nickel, silver or copper hydroxides and/or oxides. The negative plates (anodes) in such batteries are typically iron, cadmium, zinc or copper.

The positive plates are formed by applying a paste comprising an aqueous slurry of active material to a substrate of porous metal, drying the impregnated substrate to form a plate, and attaching a tab or lug to the plate. The area of the plate to which the tab or lug is attached must be substantially free of active material. It is difficult to remove active material from this area after the porous metal substrate has been coated.

It is an object of this invention to provide a method and apparatus for making battery plates of a porous metal substrate impregnated with an active material wherein the active material is precluded from the area of the impregnated plate to which a tab or lug is to be attached.

SUMMARY OF THE INVENTION

The present invention comprises compressing a narrow strip of a porous metal substrate to a substantially non-porous condition to form a compressed zone, attaching a thin metal strip to one or both sides of the substrate in a position such that the thin metal strip or strips cover the compressed zone, impregnating (pasting) the resultant porous metal substrate having the metal strip or strips attached thereto with a slurry (paste) of active material containing a metal hydroxide and/or oxide, removing excess paste from the surfaces of the porous metal substrate and removing any paste from the surface of the narrow metal strip or strips attached to the substrate, drying the impregnated substrate, and cutting the substrate in the area of the thin metal strip or strips into individual plate blanks. The compressed zone with metal strip or strips attached thereto precludes active material from impregnating the porous metal substrate at that location, and provides an area free of active material to which a tab or lug can be attached.

DESCRIPTION OF PREFERRED EMBODIMENTS

Figure 1:
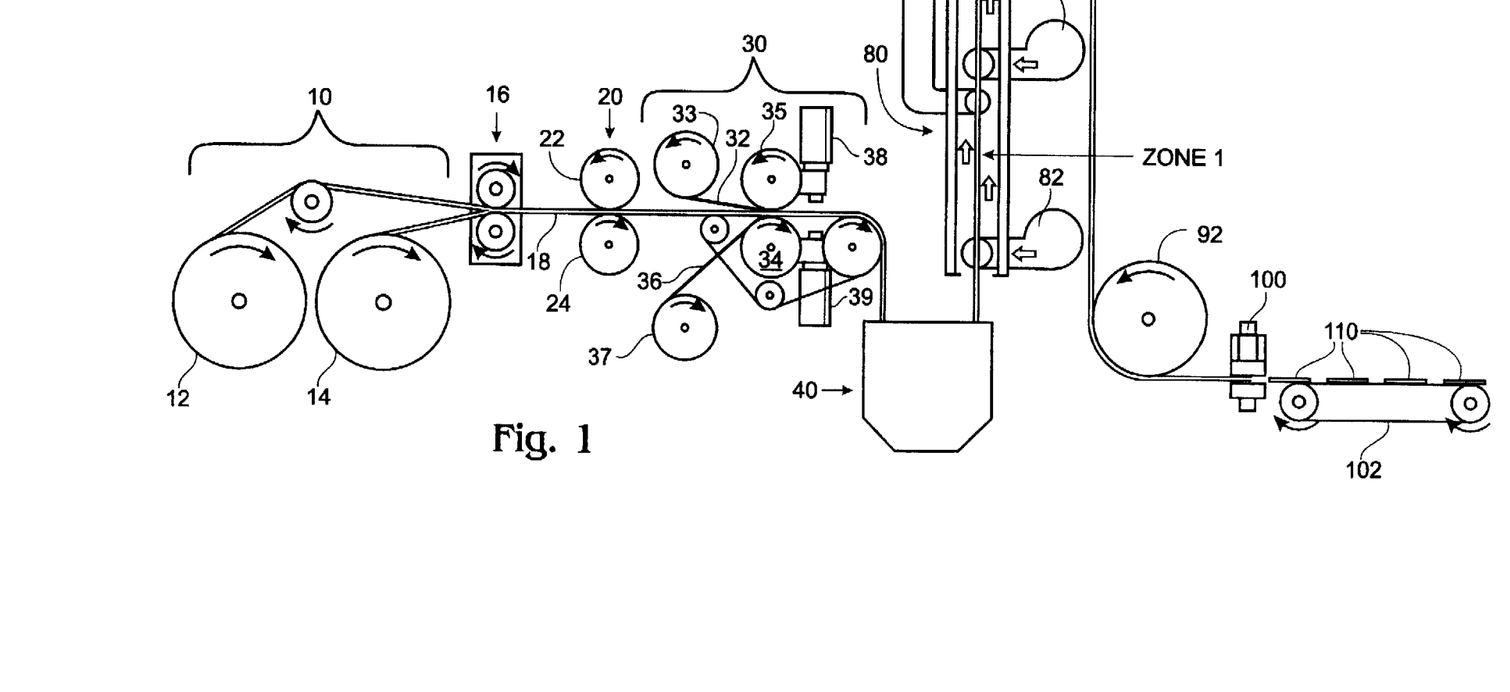
FIG. 1 is a schematic view of the process and apparatus of the present invention with the drying oven being shown in cross-section.

FIG. 1 illustrates the plate making method and apparatus of the invention. A roll supply station 10 provides two rolls 12 and 14 of porous metal substrate. A motor driven splicer, generally designated as 16, is used to splice the end of an exhausted roll of porous metal substrate to the beginning of a fresh roll so that a continuous web 18 of porous metal substrate is continuously fed to the apparatus.

Figure 2:
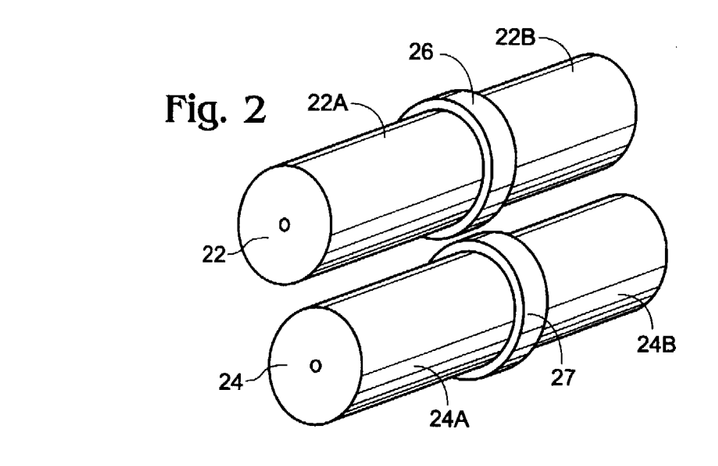
FIG. 2 is a perspective view of compression rolls 22 and 24.
Figure 11:
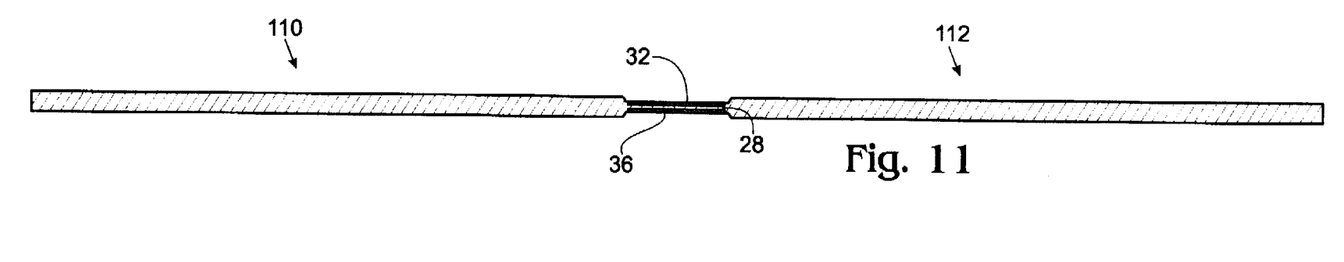
FIG. 11 is a sectional view of the web of FIG. 10 taken along line 11—11 of FIG. 10.

The continuous web of porous metal substrate 18 is fed into compression station 20. The web 18 is fed into the nip formed by motor driven compression rolls 22 and 24, which rolls are shown in more detail in FIG. 2. Compression rolls 22 and 24 have opposing sizing sections 22A and 24A, and 22B and 24B, respectively. Located in the mid-portion of each of rolls 22 and 24 are annular compression rings 26 and 27, respectively. Compression station 20 performs two functions: the web 18 passing between sizing section 22a and 24a and sizing section 22b and 24b is gently pressed on both surfaces to flatten any metal burrs projecting therefrom (i.e., the web is "sized"), and that portion of the web passing between annular compression rings 26 and 27 is compressed to a substantially non-porous state in a narrow, longitudinal (machine direction) zone 28 (as illustrated in FIG. 11).

Porous metal web 18 is next passed through seam welding station 30. Narrow metal strip 32 from roll 33 is contacted with the upper surface of porous metal web 18 in the compressed zone 28 at the nip formed by welding rolls 34 and 35. Narrow metal strip 36 from roll 37 is contacted with the lower surface of porous metal web 18 in the compressed zone 28 at the nip formed by welding rolls 34 and 35. Welding rolls 34 and 35 weld metal strips 32 and 36 to porous metal web 18 to form a unitary structure. The seam welders used in welding station 30 may be any conventional type of seam welder, such as electrical resistance types or ultrasonic types.

Figure 3:
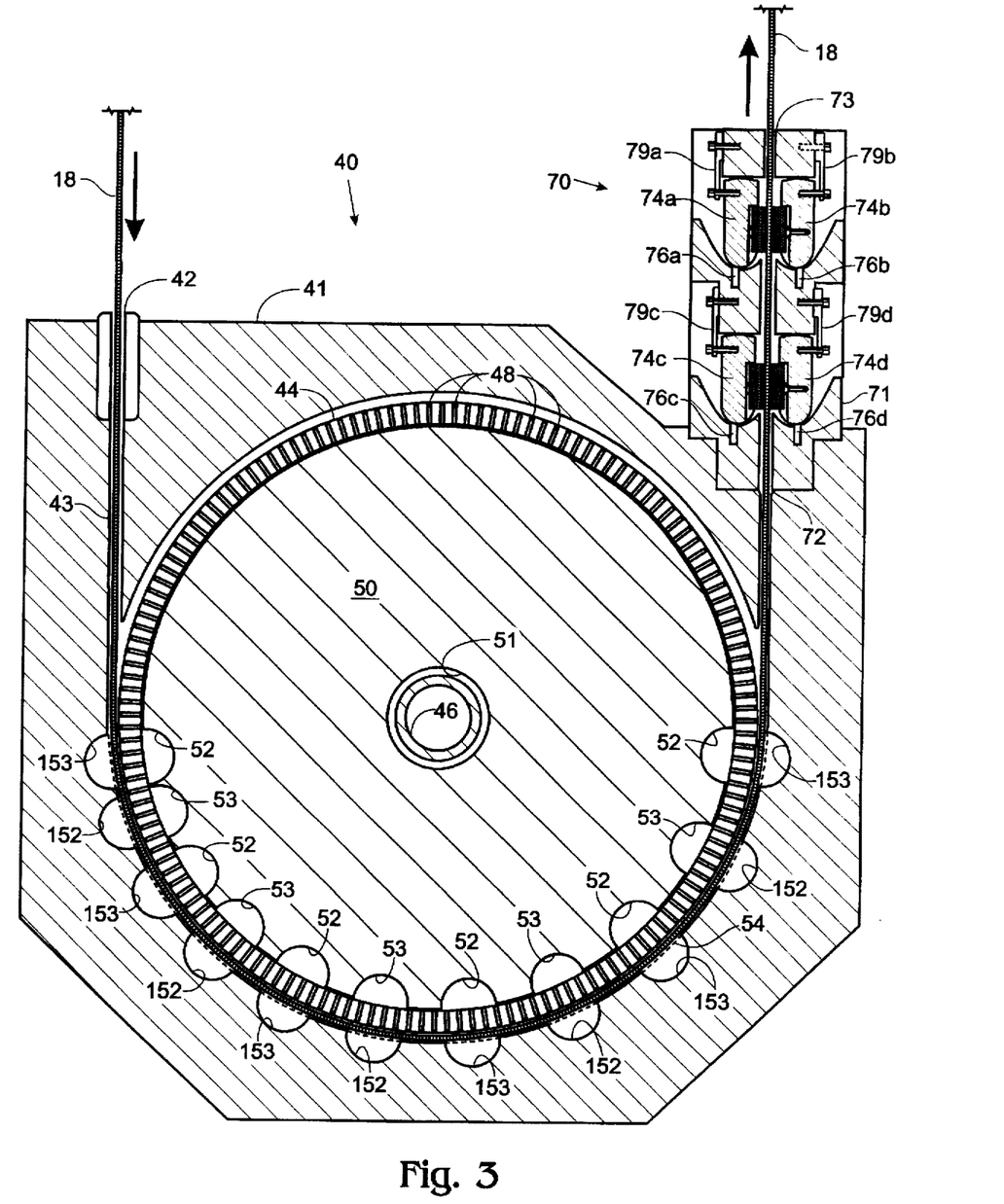
FIG. 3 is a front end sectional view of the coating head employed in the invention.

Porous metal web 18 with metal strips 32 and 36 attached to the upper and lower surfaces thereof in the compressed zone 28 is next fed into a coating station 40, illustrated in detail in FIG. 3. Web 18 is fed into the coating head housing 41 of coating head 40 via narrow threading inlet 42, passes through inlet channel 43, comes into contact with driven carrier roll 44 at the end of channel 43, is carried through a coating zone (to be described) by carrier roll 44 and exits coating head housing 41 through wiper assembly 70.

Figure 4:
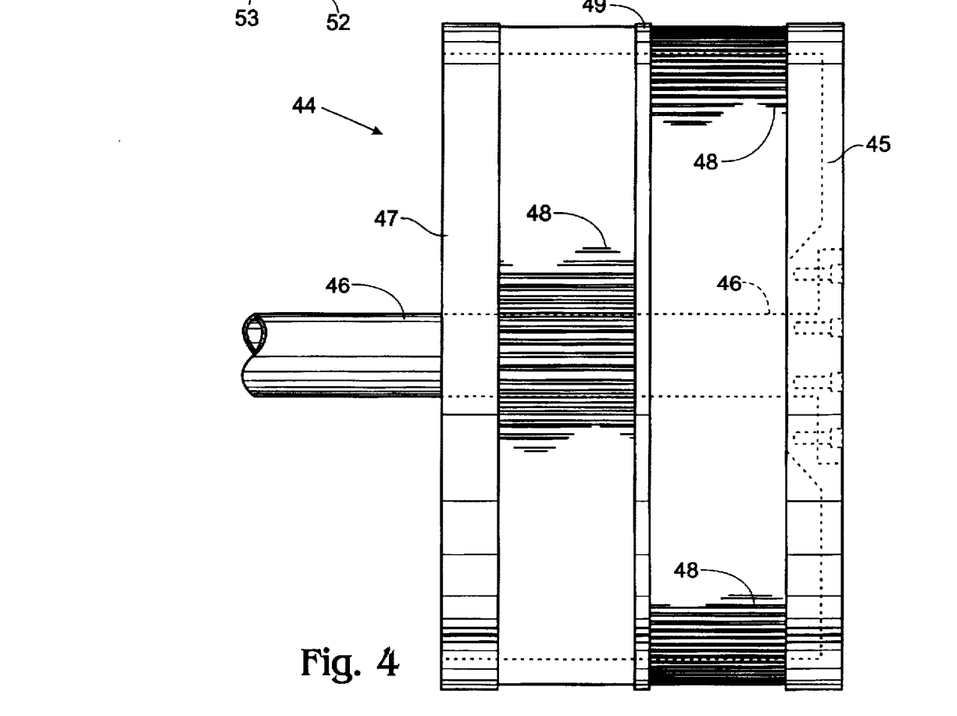
FIG. 4 is a side view of the coating head carrier roll 42.

Driven carrier roll 44 is shown in side view in FIG. 4. Carrier roll 44 has a solid end plate 45 located on the outer end thereof to which the outer end of drive shaft 46 is attached. Carrier roll 44 has an inner rim 47 and a plurality of vanes 48 extending between end plate 45 and inner rim 47. A narrow middle rim 49 is located in the middle of carrier roll 44 and on the outside of vanes 48. The purpose of middle rim 49 is to substantially prevent coating material from being applied in the area where metal strips 32 and 36 are located on web 18 and, therefore, the width of middle rim 49 is substantially the same as the width of metal strips 32 and 36.

As can be seen by reference to FIG. 3, driven carrier roll 44 is concentric with a stationary roll 50 and the inner sides of vanes 48 are in contact with the outer surface of stationary roll 50. Stationary roll 50 is preferably made of a material having a self-lubricating surface such as ultra high molecular weight polyethylene.

The shaft 46 of carrier roll 44 passes through shaftway 51 bored along the axis of stationary roll 50 and is attached to a suitable motorized driving means, not shown.

Figure 5:
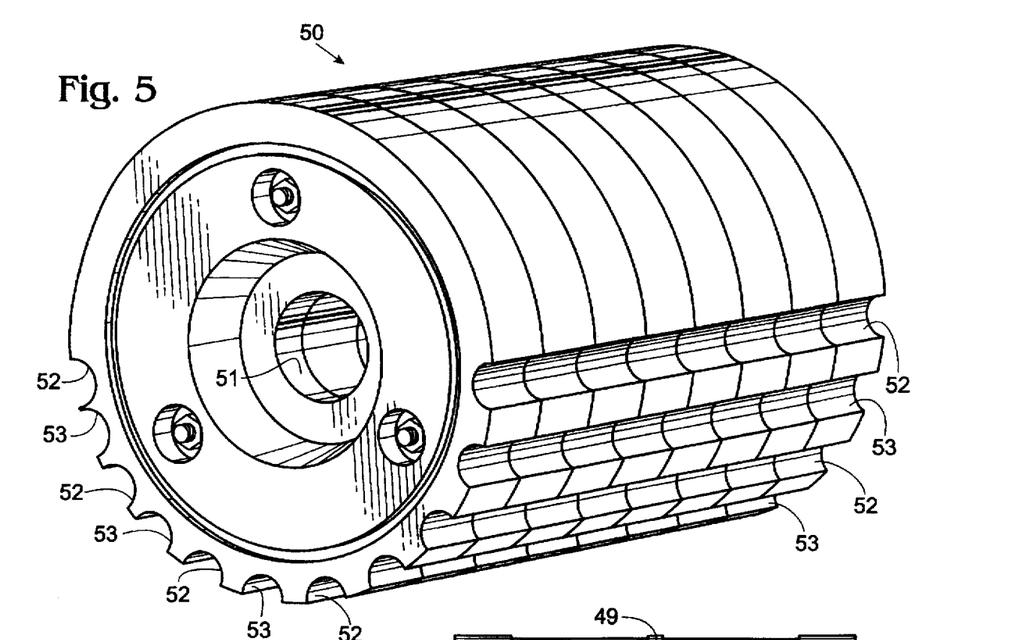
FIG. 5 is a perspective view of stationary roll 50.

As can be seen in FIGS. 3 and 5, stationary roll 50 has a plurality of channels 52 and 53 machined in the outer surface of the lower half thereof. Channels 52 and 53 are parallel to the axis of stationary roll 50 and are semicircular in cross-section. Channels 52 are coating supply channels and channels 53 are coating return channels, as will be discussed more fully below. As can be seen from FIG. 3, channels 52 and 53 alternate so that as web 18 is carried through the coating zone on carrier roll 42 the surface facing stationary roll 50 is alternately exposed to supply and return channels. Adjacent channels 52 and 53 are spaced farther and farther apart from the point where the uncoated web 18 enters the coating zone to the point where coated web 18 exits the coating zone.

The lower half of coating head housing 41 has a plurality of channels 152 and 153 machined therein. Channels 152 and 153 are semi-circular in cross-section and are parallel to the axes of carrier roll 44 and stationary roll 50. Channels 152 are coating supply channels and channels 153 are coating return channels. As can be seen from FIG. 3, supply channels 52 in stationary roll 50 are located opposite return channels 153 in coating head housing 41 and return channels 53 in stationary roll 50 are located opposite supply channels 152 in coating head housing 41.

A screen 54 is located over channels 152 and 153 to reduce or eliminate flow of coating material between adjacent channels.

Figure 6:
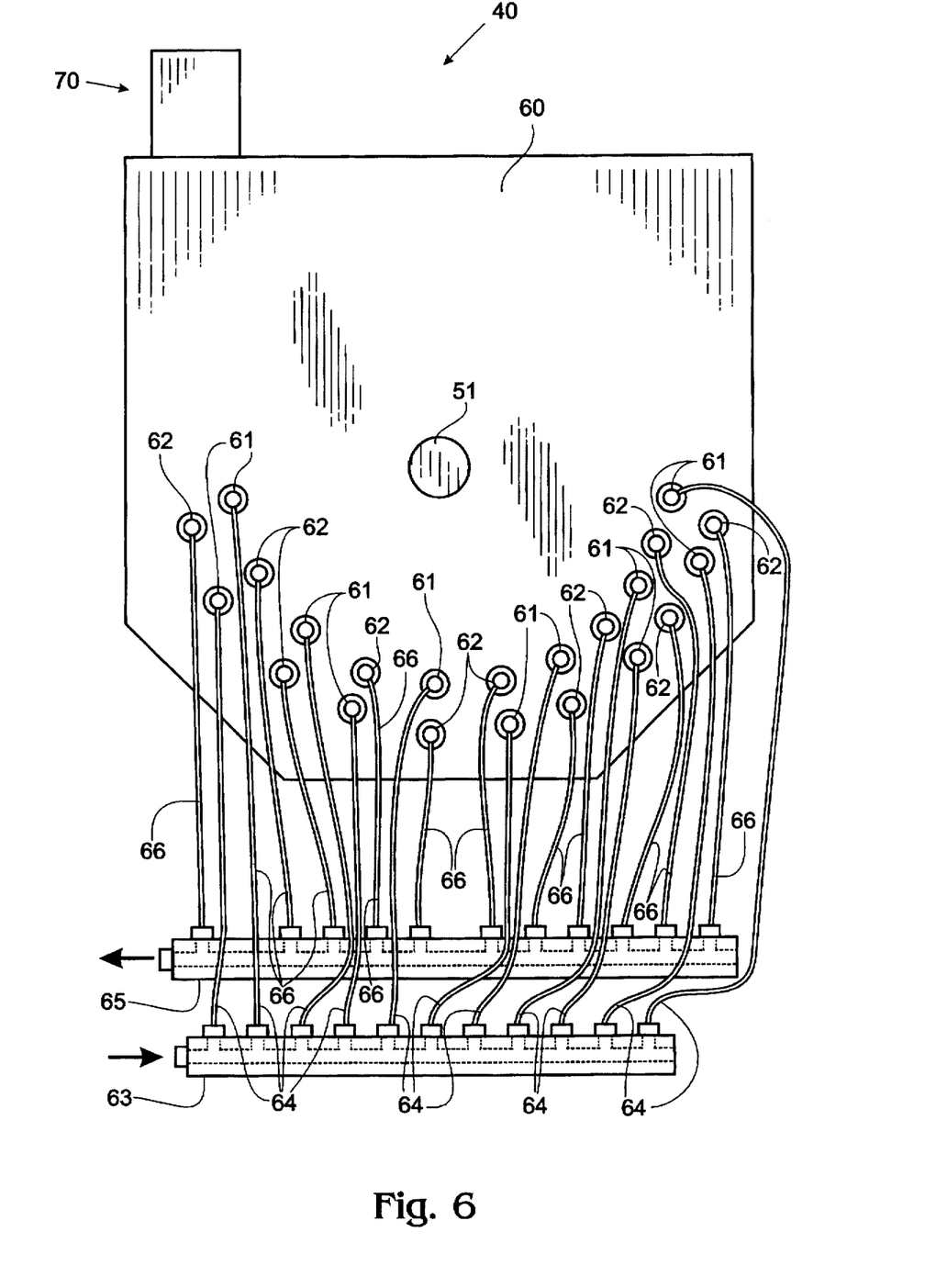
FIG. 6 is a rear end view of the coating head of the invention.

FIG. 6 illustrates the supply and return of coating to the coating head 40. An end plate 60 is located on the rear end of coating head 40. A plurality of holes (not shown) are drilled in the end plate 60 in locations to communicate with channels 52, 53, 152 and 153. Fittings 61 and 62 are fixed in the drilled holes in a leakproof manner. Fittings 61 communicate with a coating supply manifold 63 via conduits 64 and fittings 62 communicate with a coating return manifold 65 via conduits 66. Coating supply manifold 63 and coating return manifold 65 communicate with a coating supply source, not shown.

In operation of coating station 40, an uncoated porous metal web 18 with metal strips 32 and 36 attached to both surfaces thereof in compressed zone 28 enters the coating station 40 via threading inlet 42. The uncoated web 18 passes through inlet channel 43 and comes into contact with a rotating carrier roll 44. The web 18 then passes between a first plurality of opposed coating supply channels 52 and coating return channels 153, wherein the coating supply channels 52 are located adjacent a first planar surface of web 18, and between a second plurality of opposed coating supply channels 152 and coating return channels 53, wherein the coating supply channels 152 are located adjacent the second planar surface of web 18. The two pluralities of opposed coating supply and coating return channels alternate so that each of the two planar surfaces of web 18 are alternately exposed to coating supply and coating return channels. Thus porous metal web 18, as it proceeds through the coating zone, has coating material forced through it alternately from the first planar surface to the second planar surface and then from the second planar surface to the first planar surface.

After impregnation of porous metal web 18 with coating material in the coating zone of coating head 40, the impregnated web passes through wiping assembly 70 to remove excess coating material from the surfaces of porous web 18 and to remove substantially all of any coating material adhering to metal strips 32 and 36.

The wiping assembly 70 is shown in FIGS. 3, 7, 8 and 9. As can be generally seen in FIG. 3, impregnated web 18 enters wiping housing 71 via slot 72 and exits via slot 73. Trowel assemblies 74a, 74b, 74c and 74d wipe excess coating from both surfaces of web 18 and substantially removes any coating adhering to metal strips 32 and 36.

Figure 7:
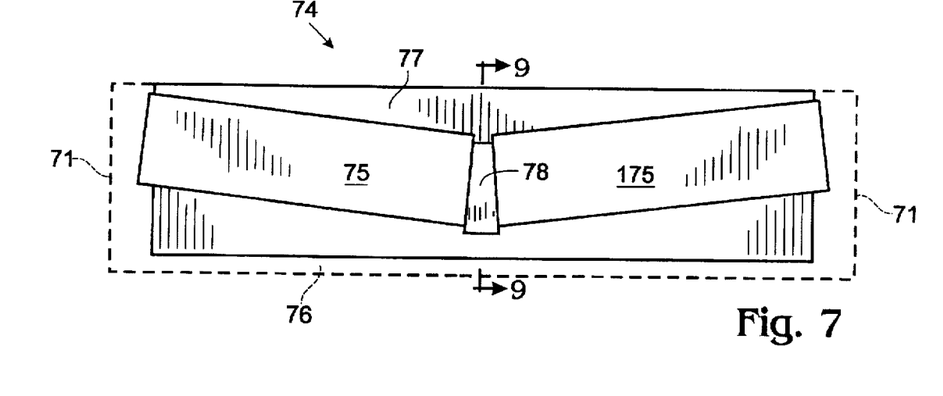
FIG. 7 is a front view of the trowel assembly.
Figure 8:
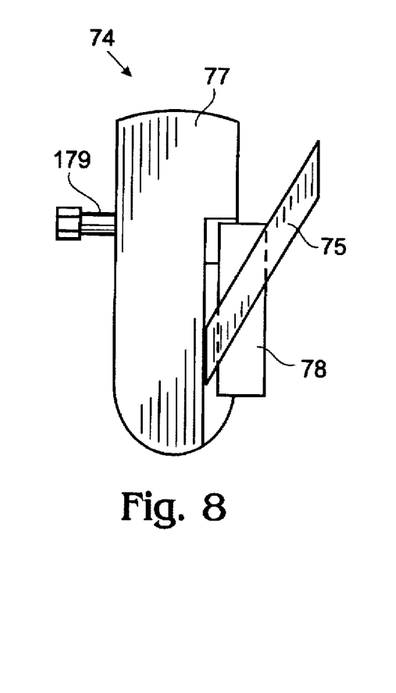
FIG. 8 is a front end view of the trowel assembly.
Figure 9:
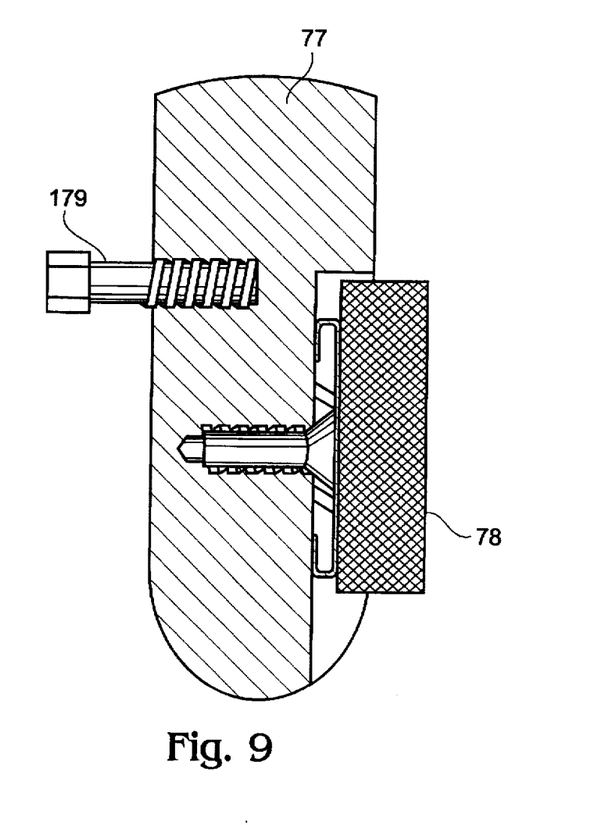
FIG. 9 is a cross-sectional view of the trowel assembly taken along line 9—9 of FIG. 7.

Details of the trowel assembly 74 are shown in FIGS. 7, 8 and 9. Each trowel assembly 74 consists of two blades 75 and 175 which slope upwardly from the middle of the trowel assembly. The blades 75 and 175 are attached to a trowel backing plate 77.

In the middle of the trowel backing plate 77 and located between the inner ends of blades 75 and 175 is a sponge 78 attached to trowel backing plate 77 as illustrated in FIG. 9. The sponges 78 attached to each of the trowel assemblies 74a–74d contact the metal strips 32 and 36 to remove any coating material that might be adhering thereto.

The trowel assemblies 74a–74d are inserted into trowel housing 71 as illustrated in FIG. 3 and are held firmly in place by rotatable latches 79a–79d when said latches are rotated into latching contact with catches 179 located on the backside of each trowel assembly 74.

As the impregnated web 18 passes through wiping assembly 70 it first passes between trowel assemblies 74c and 74d. The upper and lower planar faces of web 18 are contacted by blades 75 and 175 of trowel assemblies 74c and 74d, respectively, to remove excess coating from the surface area of web 18 not occupied by strips 32 and 36. Strips 32 and 36 are contacted by sponges 78 located on trowel assemblies 74c and 74d, respectively, to remove any coating material adhering thereto. Since metal strips 32 and 36 are protected by middle rim 49 of carrier roll 44 as the web passes through the coating zone of coating head 40, very little coating adheres to metal strips 32 and 36.

Excess coating removed by blades 75 and 175 is removed from wiping assembly 70 as follows. Located in the bottom of each portion of wiping housing 71 where trowel assemblies 74a–74d are seated are channels 76a–76d, as shown in FIG. 3. As can be best seen by reference to FIG. 7, each trowel assembly 74 is not as long as the adjacent wiping housing 71 (shown in phantom in FIG. 7). Excess coating removed by blades 75 and 175 travels in a direction from the inner ends of blades 75 and 175 to the outer ends thereof. As the excess coating reaches the outer ends of blades 75 and 175 it drops downwardly in the spaces located between the outer ends of trowel backing plate 77 and into channel 76 where it flows outside of wiping housing 71 via an opening in wiping housing 71 adjacent one or both ends of channel 76 (not shown).

As can be seen, impregnated web 18 is subjected to wiping at a first wiping station consisting of trowel assemblies 74c and 74d and at a second wiping station consisting of trowel assemblies 74a and 74b.

Impregnated and wiped web 18 is next fed into a drying oven 80. Although the drying oven 80 may be any of several known types, it is preferred to use a two zone infrared drying oven having a temperature range of between about 70 and about 1500 degrees F. The temperatures chosen for drying the impregnated web depend on several factors, including line speed and the length of the over. In Zone 1 outside air at room temperature is blown into the oven by blower 82. The air moves through Zone 1 where it picks up moisture and solvent emitted from the heated web 18 and then passes through duct 84 to a suitable collection system. Similarly, in Zone 2 outside air at room temperature is blown in the oven by blower 86. The air moves through Zone 2 where it picks up moisture and solvent emitted from the heated web 18 and then passes through duct 88 to a suitable collection system.

The dried web 18 next passes around two driven turning rolls 90 and 92 and fed into a shearing station 100. In shearing station 100 the web is cut into individual plate blanks in the area of the metal strips 32 and 36, as will be more full explained below, and also cut transversely.

Plate blanks 110 are removed from shearing station 100 on belt conveyer 102. A weigh scale (not shown) may be used to inspect for blanks outside a predetermined acceptable weight range. The plate blanks are then fed by belt conveyer 102 to a suitable stacking device, not shown.

Figure 10:
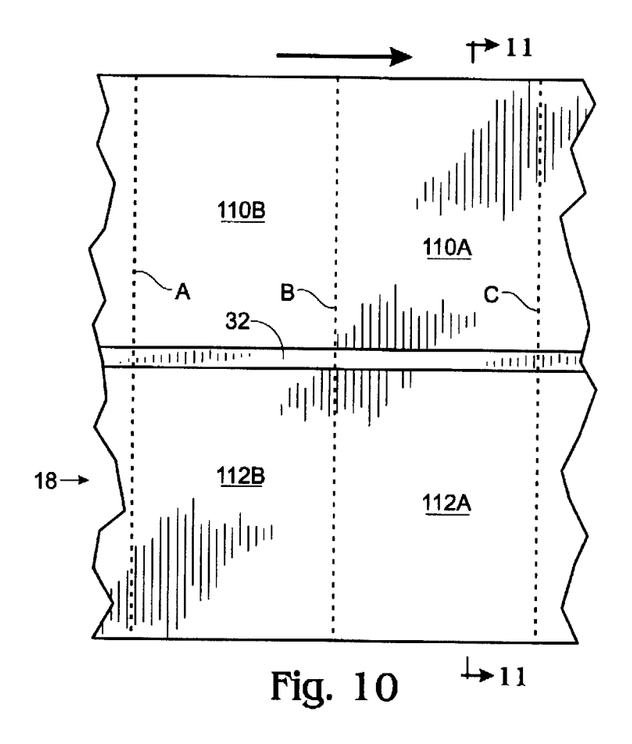
FIG. 10 is top view of the metal web as it appears after the attachment of the metal strip, paste impregnation and drying steps.

FIG. 10 illustrates the upper surface of a portion of impregnated porous metal web 18 having a metal strip 32 attached to the upper surface of compression zone 28. It might be noted that the lower surface would look the same except that the metal strip would be strip 36 attached to the lower surface of compression zone 28. The dotted lines A, B and C show the location of the edges of the plate blanks 110 and 112 to be ultimately cut from web 18.

FIG. 11, a cross-sectional view taken along line 11—11 of FIG. 10 illustrates porous web 18 having an embossed zone 28 with metal strips 32 and 36 attached by seam welds to the upper and lower surfaces, respectively, thereof.

Figure 12:
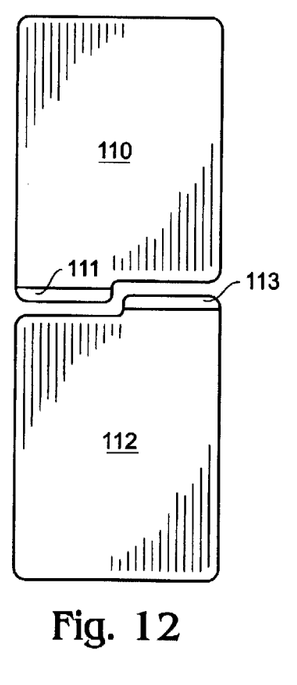
FIG. 12 is a top view of two plate blanks immediately after the cutting step.

FIG. 12 illustrates two plate blanks 110 and 112 cut from web 18. Plate blanks 110 and 112 have tabs 111 and 113, respectively, extending therefrom. Tabs 111 and 113 are formed from the area where the metal strips 32 and 36 were located. Tabs 111 and 113 provide a conductive path between plates 110 and 112 and the external circuit of the battery into which the plates are to be incorporated.

Figure 13:
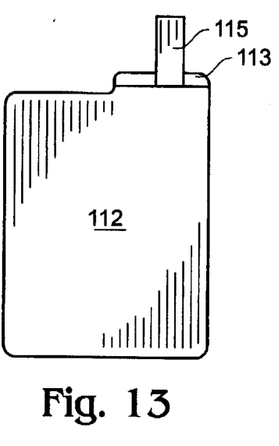
FIG. 13 is a view of a single plate having a tab or lug attached thereto.

FIG. 13 illustrates a conductive lug 115 attached to tab 113 of plate 112. Such lugs extending from a plurality of plates of common polarity provide a means to connect all such plates to a common external post in a manner well known in the art.

For the sake of simplicity of illustration, FIGS. 10–13 illustrate a web 18 wide enough to produce two plates across the width thereof. However, it is clear that the width of web 18 could be chosen so that multiple compressed zones and metal strip attachments thereto could be accomplished, thereby permitting more than two plate blanks to be produced for each unit of web length equating to the plate blank width.

The preferred plate produced by the method and apparatus of this invention is a positive plate for a nickel metal hydride battery. In this preferred embodiment the porous metal web 18 is sintered nickel powder or fibers and the narrow metal strips 32 and 36 are non-porous nickel.

EXAMPLE

A porous metal sheet of sintered nickel fibers 3.84 inches by 10.52 inches and a thickness of 0.065 inch was compressed between two flat metal bars, each bar having a width of 1.0 inch and a length of 4.0 inches, to form a compressed area in the central portion of the sheet. The compressed area had a width of 1.0 inch and the thickness of the metal sheet in the compressed area was reduced to 0.003 inch. A solid nickel strip 1.0 inch in width and 0.005 inch thick was seam welded to each side of the porous nickel sheet in the compressed area with an electrical resistance seam welder manufactured by Aidlin Automation. The weld seam was ⅛ inch in width. The resulting porous nickel substrate having nickel strips attached to both sides thereof in the compressed area was impregnated with an aqueous slurry comprised of nickel hydroxide powder, binder and minor additives. The slurry was removed from both nickel strips by wiping with a rubber squeegee. The impregnated substrate was dried to a moisture content of 8% in an infrared oven. The dried substrate was cut into two plate blanks in the area of the nickel strips, as illustrated in FIG. 12.

The invention claimed is:

1. A method of making metal hydroxide plate blanks for use in an electrochemical cell comprising compressing a porous metal web in at least one compression zone to a substantially non-porous state, attaching at least one non-porous strip of the same metal to said porous metal web in the compression zone, impregnating said porous metal web with a coating of electrochemically active material to form an impregnated web, removing excess coating from said impregnated web, drying said impregnated web to form a dried web, and dividing the dried web into plate blanks in the area of said metal strip.

2. The method of claim 1 wherein said porous metal web is impregnated with said coating by alternately forcing coating material through a first planar surface and out the second planar surface and forcing coating material through said second planar surface and out said first planar surface.

3. The method of claim 1 wherein said metal is selected from the group consisting of nickel, silver and copper.

4. The method of claim 3 wherein said metal is nickel.

5. The method of claim 1 wherein said metal strip is attached to both surfaces of said porous metal web in the compression zone.

6. An apparatus for making metal hydroxide plate blanks for use in an electrochemical cell comprising means for compressing a porous metal web in a narrow compression zone, means for attaching at least one non-porous strip of the same metal to said porous metal web in the compression zone, means for impregnating said porous metal web with a coating of electrochemically active material, means for removing excess coating from said impregnated web, means for drying said impregnated web, and means for dividing the dried web into individual plate blanks in the area of said metal strip.

7. The apparatus of claim 6 wherein the means for impregnating said porous metal web is a coating head comprising: a coating housing having a cylindrical cavity located therein, the face of the coating housing forming the lower half of said cavity having a plurality of parallel channels located therein; a cylindrical stationary roll located within said cavity, said stationary roll having a plurality of parallel channels in the outer surface of the lower half thereof, said channels being parallel to the axis of said stationary roll and in alignment with and opposite to the channels located in the coating housing; a cylindrical carrier roll surrounding said stationary roll, said stationary roll and said carrier roll having a common axis, said carrier roll having an outer end plate and an inner rim with a plurality of vanes extending from said end plate to said inner rim, a narrow middle rim located in the middle of the carrier roll on the outside of said vanes, and means for driving said carrier roll; means for supplying and returning coating to and from said coating housing including conduit means for alternately supplying and returning coating to and from adjacent channels in said stationary roll and alternately to and from adjacent channels in said coating housing and wherein one of said opposite channels in said stationary roll and said coating housing communicates with the coating supply means and the other of said opposite channels communicates with the coating return means; said coating housing having a web inlet channel for introducing said web into said coating housing and into contact with said carrier roll and an exit channel for passing said web out of said coating housing.

8. The apparatus of claim 6 wherein said means for removing excess coating material is a wiping assembly comprising: blades for removing excess coating from said web and sponge means for removing any coating from said metal strip.

9. A coating apparatus for impregnating a porous web comprising: a coating housing having a cylindrical cavity located therein, the face of the coating housing forming the lower half of said cavity having a plurality of parallel channels located therein; a cylindrical stationary roll located within said cavity, said stationary roll having a plurality of parallel channels in the outer surface of the lower half thereof, said channels being parallel to the axis of said stationary roll and in alignment with and opposite to the channels located in the coating housing; a cylindrical carrier roll surrounding said stationary roll, said stationary roll and said carrier roll having a common axis, said carrier roll having an outer end plate and an inner rim with a plurality of vanes extending from said end plate to said inner rim, a narrow middle rim located in the middle of the carrier roll on the outside of said vanes, and means for driving said carrier roll; means for supplying and returning coating to and from said coating housing including conduit means for alternately supplying and returning coating to and from adjacent channels in said stationary roll and alternately to and from adjacent channels in said coating housing and wherein one of said opposite channels in said stationary roll and said coating housing communicates with the coating supply means and the other of said opposite channels communicates with the coating return means; said coating housing having a web inlet channel for introducing said web into said coating housing and into contact with said carrier roll and an exit channel for passing said web out of said coating housing.

* * * * *